(12) United States Patent
Buza et al.

(10) Patent No.: US 9,845,055 B2
(45) Date of Patent: Dec. 19, 2017

(54) VEHICLE CENTER CONSOLE ASSEMBLY

(71) Applicant: Nissan North America, Inc., Franklin, TN (US)

(72) Inventors: Jessica Buza, Riverview, MI (US); Hsiao-Tung Yang, Novi, MI (US); Thomas Mally, Beverly Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 12 days.

(21) Appl. No.: 14/871,539

(22) Filed: Sep. 30, 2015

(65) Prior Publication Data

US 2017/0088060 A1   Mar. 30, 2017

(51) Int. Cl.
*B60R 7/04* (2006.01)
*B60R 7/08* (2006.01)

(52) U.S. Cl.
CPC . *B60R 7/04* (2013.01); *B60R 7/08* (2013.01)

(58) Field of Classification Search
CPC ........... B60R 7/04; B60R 7/08; B60N 2/4606; B60N 2/4686
USPC ......................................... 296/243.34, 24.34
See application file for complete search history.

(56) References Cited

U.S. PATENT DOCUMENTS

| 5,195,711 | A | 3/1993 | Miller et al. |
| 5,316,368 | A | 5/1994 | Arbisi |
| 5,562,331 | A | 10/1996 | Spykerman et al. |
| 6,045,173 | A * | 4/2000 | Tiesler ................. B60N 2/4646 220/813 |
| 6,619,738 | B1 | 9/2003 | Filipovich |
| 6,851,736 | B1 * | 2/2005 | Klopp, III ................. B60R 7/04 224/926 |
| 6,929,304 | B1 | 8/2005 | Dry et al. |
| 7,147,259 | B2 | 12/2006 | Radu et al. |
| 7,513,553 | B2 * | 4/2009 | Singh ....................... B60N 3/08 296/37.8 |
| 7,581,774 | B2 * | 9/2009 | Abro ......................... B60R 7/04 296/24.34 |
| 7,766,408 | B2 * | 8/2010 | Lota ...................... B60N 2/4606 296/24.34 |

(Continued)

FOREIGN PATENT DOCUMENTS

| DE | 3143957 A1 | 5/1983 | |
| EP | 2468575 A2 * | 6/2012 | .......... B60N 2/4686 |
| JP | 2009083817 A * | 4/2009 | |

*Primary Examiner* — Pinel E Romain
(74) *Attorney, Agent, or Firm* — Global IP Counselors, LLP

(57) ABSTRACT

A vehicle center console assembly includes a main body structure, a lid and a tray. The main body structure defines a storage compartment having a first tray supporting portion. The lid is attached to the main body structure for pivoting from a closed orientation completely covering the storage compartment to an open orientation exposing the storage compartment. The lid has a second tray supporting portion. The tray has a pair of projections that extend from opposite sides of the tray. The tray is movable to each of the following: a first orientation with the pair of projections supported by the first tray supporting portion within the storage compartment, a second orientation with the pair of projections inserted into the second tray supporting portion for movement with the lid, and a third orientation where the tray is completely removed and separated from the center console assembly.

18 Claims, 7 Drawing Sheets

(56) References Cited

U.S. PATENT DOCUMENTS

| | | | |
|---|---|---|---|
| 8,052,190 B2 | 11/2011 | Vander Sluis et al. | |
| 8,100,454 B2 * | 1/2012 | D'Alessandro | B60R 7/04 |
| | | | 296/37.8 |
| 8,215,688 B2 * | 7/2012 | Hipshier | B60R 7/04 |
| | | | 296/24.34 |
| 8,371,633 B2 * | 2/2013 | Beyer | B60N 3/08 |
| | | | 224/280 |
| 8,714,613 B1 * | 5/2014 | Gillis | B60R 7/04 |
| | | | 296/24.34 |
| 9,045,087 B2 * | 6/2015 | Duenas | B60N 2/4686 |
| 9,156,407 B1 * | 10/2015 | Kramer | B60R 7/04 |
| 2011/0215605 A1 * | 9/2011 | Spitler | B60N 3/00 |
| | | | 296/24.34 |
| 2014/0284957 A1 * | 9/2014 | Duenas | B60N 2/4686 |
| | | | 296/37.9 |
| 2015/0035308 A1 * | 2/2015 | Huebner | B60R 7/04 |
| | | | 296/37.8 |
| 2017/0057416 A1 * | 3/2017 | Yang | B60R 7/04 |

* cited by examiner

VEHICLE CENTER CONSOLE ASSEMBLY

BACKGROUND

Field of the Invention

The present invention generally relates to center console assembly having a storage compartment with a lid and a fray. More specifically, the present invention relates to center console assembly with a tray configured to removably attach to the lid of the center console assembly.

Background Information

Center console assemblies in vehicles are typically provided with a storage compartment and a lid that pivots between an open orientation exposing the storage compartment and a closed orientation covering and concealing the storage compartment.

SUMMARY

On object of the disclosure is to provide a center console with a removable tray that can also be installed to a structure on the lid such that the tray moves with the lid between an open orientation and a closed orientation.

In view of the state of the known technology, one aspect of the present disclosure is to provide a vehicle center console assembly with a main body structure a lid and a removable tray. The main body structure defines a storage compartment having a first tray supporting portion. The lid is attached to the main body structure for pivoting movement such that the lid moves between a closed orientation completely covering the storage compartment and an open orientation exposing the storage compartment, the lid having a second tray supporting portion. The tray has a cargo receiving area and a pair of projections that extend from opposite sides of the tray. The tray is movable to each of the following: a first orientation in which the pair of projections are supported by the first tray supporting portion within the storage compartment, a second orientation in which the pair of projections are installed to the second tray supporting portion for movement with the lid, and a third orientation in which the tray is completely removed and separated from both the main body and the lid.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
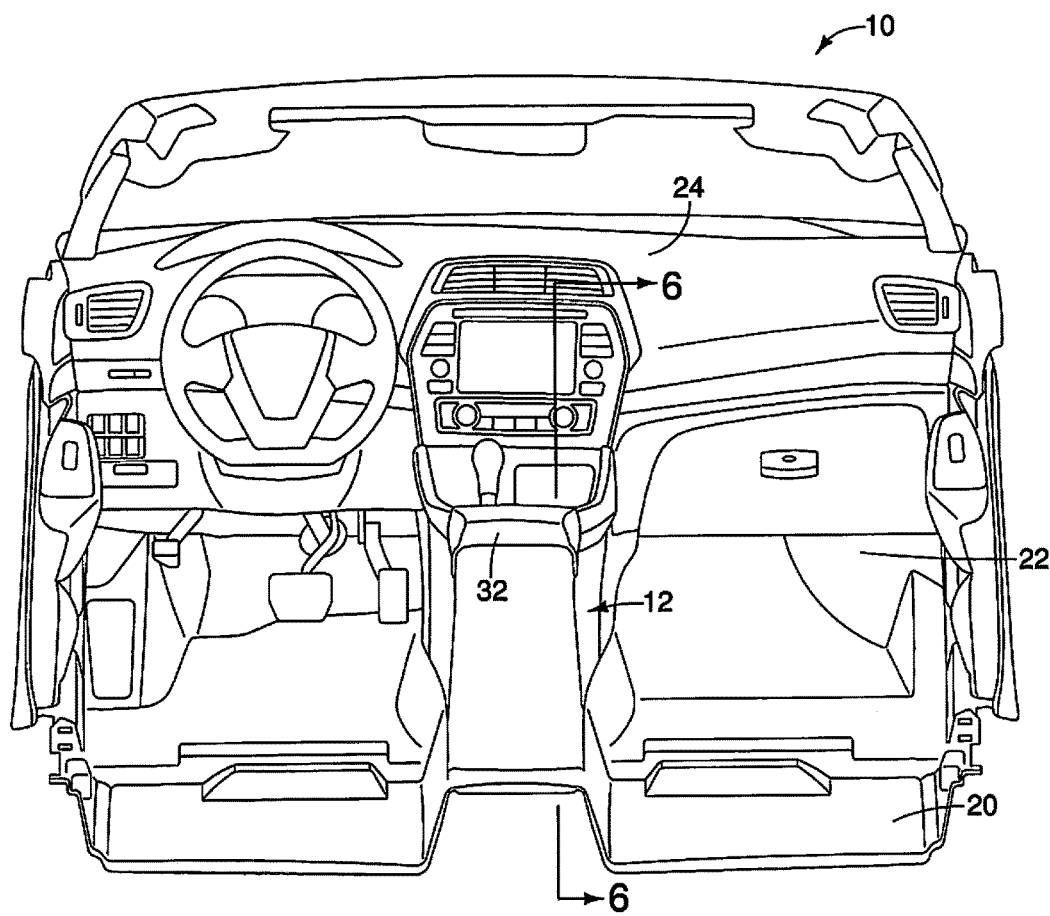
FIG. 1 is a perspective view of a passenger compartment of a vehicle showing a center console assembly in accordance with a first embodiment.
Figure 2:
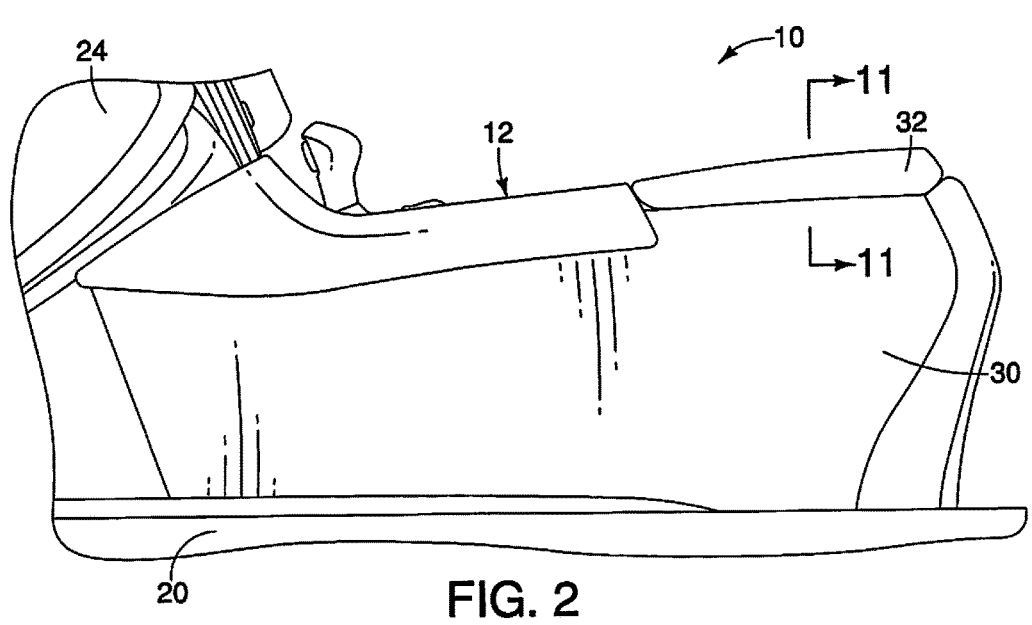
FIG. 2 is a side view of a portion of the passenger compartment showing the center console assembly with a lid in a closed orientation in accordance with the first embodiment.

Referring initially to FIGS. 1 and 2, a vehicle 10 having a center console 12 is illustrated in accordance with a first embodiment. As described in greater detail below and shown initially in FIGS. 3-5, the center console 12 also includes a tray 14.

As shown in FIGS. 1 and 2, the vehicle 10 defines a passenger compartment that includes a floor 20, a dashwall 22, an instrument panel 24 attached to the dashwall 22 in a conventional manner and the center console 12. The center console 12 is attached to the floor 20 between front seats (not shown) in a conventional manner and can optionally be attached to a central portion of the instrument panel 24 in a conventional manner. Alternatively, the center console 12 can align with the central portion of the instrument panel 24, but can have a non-attached relationship with the instrument panel 24.

Figure 3:
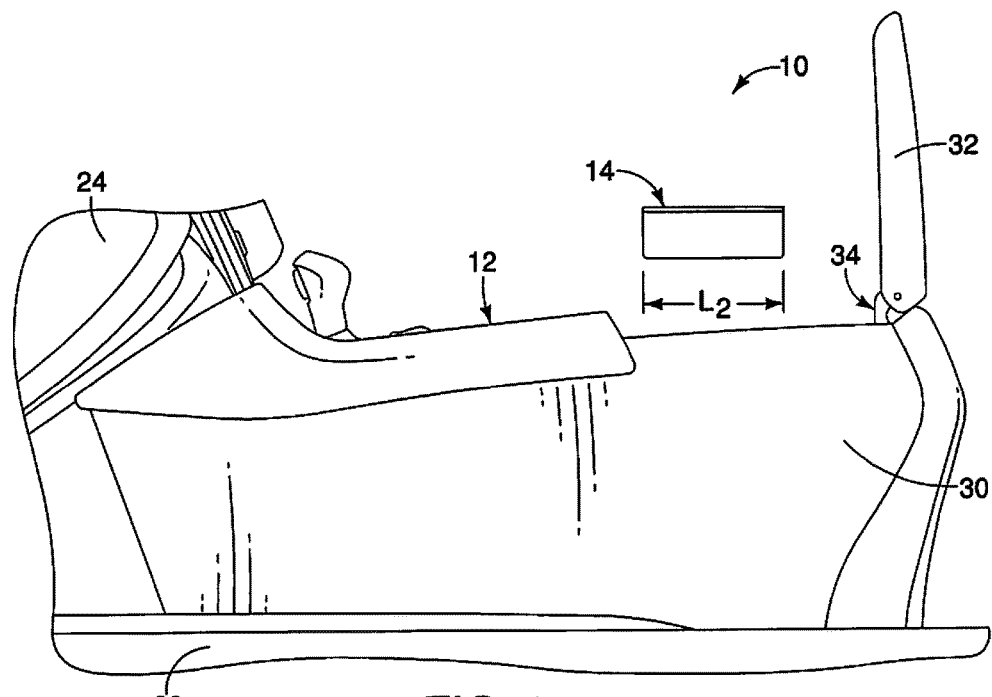
FIG. 3 is another side view of the portion of the passenger compartment similar to FIG. 2 showing the center console assembly with the lid in an open orientation and a tray in a lifted orientation removed from the center console assembly in accordance with the first embodiment.
Figure 4:
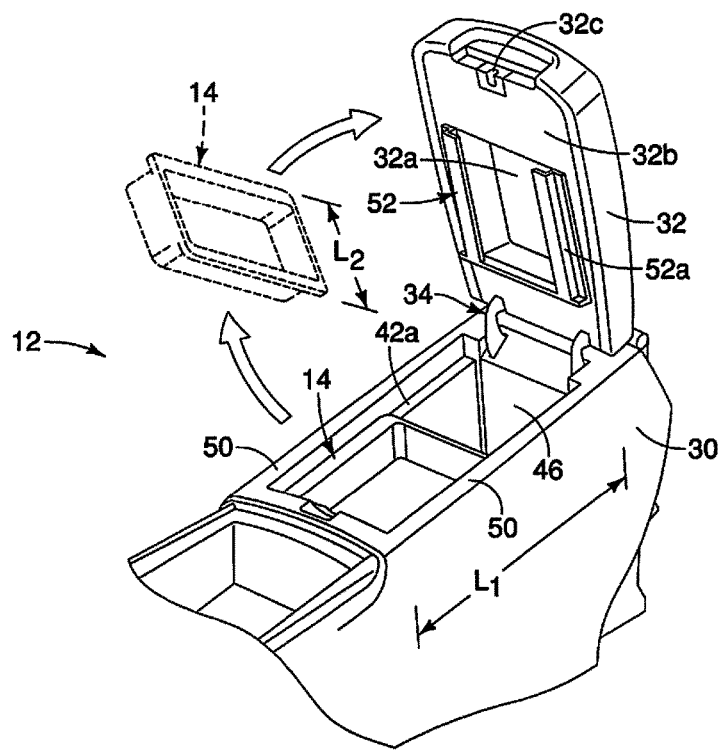
FIG. 4 is a perspective view of the center console assembly removed from the passenger compartment of the vehicle with the lid in the open orientation exposing a tray supporting portion and showing the tray in an installed orientation within a storage compartment of the center console assembly and also in another lifted orientation removed from the storage compartment (in phantom) in accordance with the first embodiment.
Figure 5:
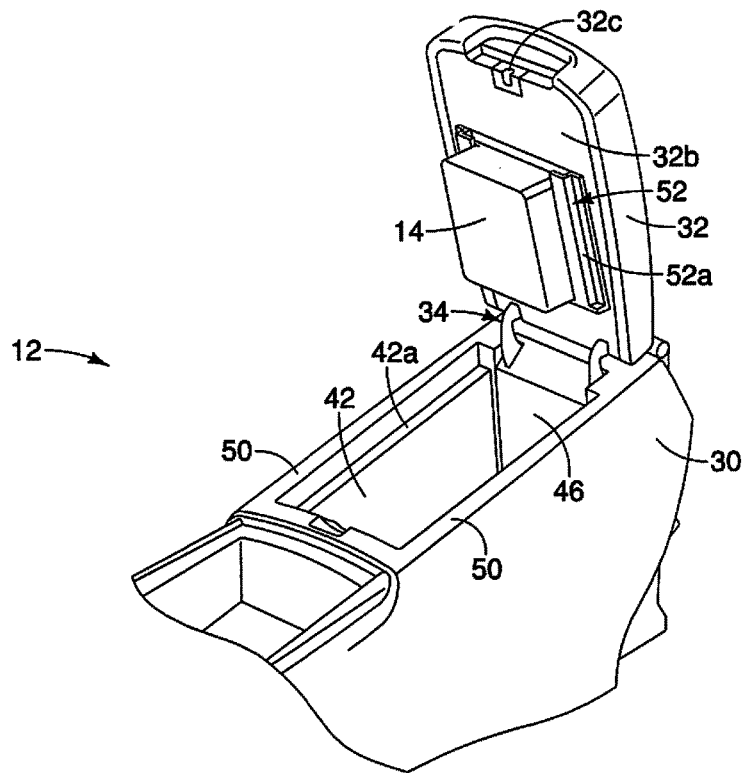
FIG. 5 is another perspective view of the center console assembly similar to FIG. 4 showing the lid in the open orientation and showing the tray inserted into the tray supporting portion of the lid in accordance with the first embodiment.

A description of the center console 12 is now provided with initial reference to FIGS. 3-5. The center console 12 is an assembly that can have any of a variety of overall shapes and configuration. However, in the depicted embodiment the center console 12 includes at least a main body structure 30, a lid 32, a lid hinge 34 and the tray 14.

The main body structure 30 includes an inner frame (not shown) and outer trim surfaces that can be formed unitarily with the inner frame or can be separate panels that attach to the inner frame by mechanical fasteners, such as, for example, threaded screws, snap-fitting fasteners or rivets. Since main body structures of center console assemblies are conventional structures well known in the art, further description is omitted for the sake of brevity.

The main body structure 30 defines a storage compartment 40 that is located between opposing side walls 42 (only one of the side walls 42 is shown in the drawings) and between a front wall 44 and a rear wall 46. The storage compartment 40 is further defined by a bottom wall 48, but has an open upper end that is covered by the lid 32 with the lid 32 in a closed orientation (FIG. 2). The main body structure 30 also includes an upper surface 50 that encircles an open upper end of the storage compartment 40. Each of the side walls 42 of the storage compartment 40 can optionally include an inwardly protruding projection 42a. The projections 42a extend toward one another from the opposing side walls 42. The projections 42a define a tray supporting portion (a first tray supporting portion), as is described in greater detail below.

Figure 6:
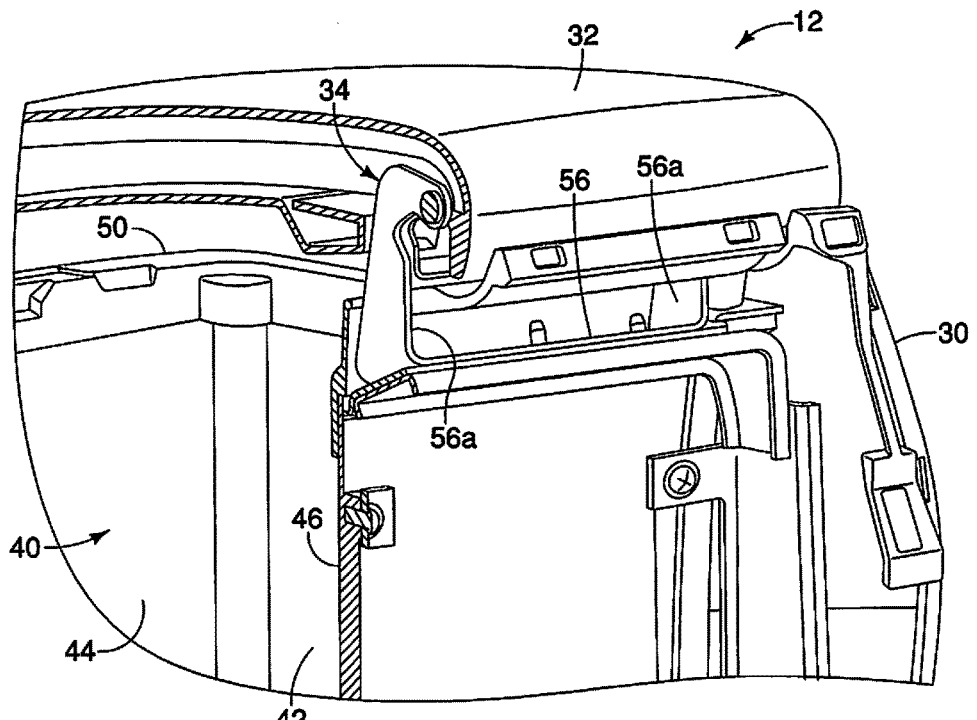
FIG. 6 is a cross-sectional view of a rear portion of the center console assembly taken along the line 6-6 in FIG. 1 showing details of a lid hinge and the storage compartment of the center console assembly with the tray completely removed in accordance with the first embodiment.

The lid 32 is attached to a rear portion of the main body structure 30 by the lid hinge 34. The lid hinge 34 is structured such that the lid 32 is movable from the closed orientation (FIGS. 1, 2 and 6) completely covering and concealing both the storage compartment 40 and the tray 14, and an open orientation (FIGS. 3-5) exposing the tray 14 and the storage compartment 40. As shown in FIGS. 5 and 6, an underside of the lid 32 includes a recessed area 32a surrounded by a bottom surface 32b. The recessed area 32a that provides the tray 14 with an increased vertical capacity. Specifically, the tray 14 can receive small items that extend above an upper edge 14a of the tray 14 (an increase in the space above the tray 14). Since the recessed area 32a (a concaved area) is provided within the lid 32, the lid 32 can be moved to the closed orientation without interference from items stowed in the tray 14. The lid 32 can also include a latch mechanism 32c that releasably engages the front wall 44 of the main body structure 30 such that with the latch mechanism 32c engaged, the lid 32 is retained in the closed orientation.

With the lid 32 in the closed orientation, exposed surfaces (such as upper and side surfaces of the lid 32) can be provided with a decorative appearance (not shown) such that the appearance of the lid 32 can conform to an overall design of an interior of the vehicle 10. As is described in greater detail below, the lid 32 also includes a tray supporting portion 52 (a second tray supporting portion) that is described in greater detail below.

Figure 7:
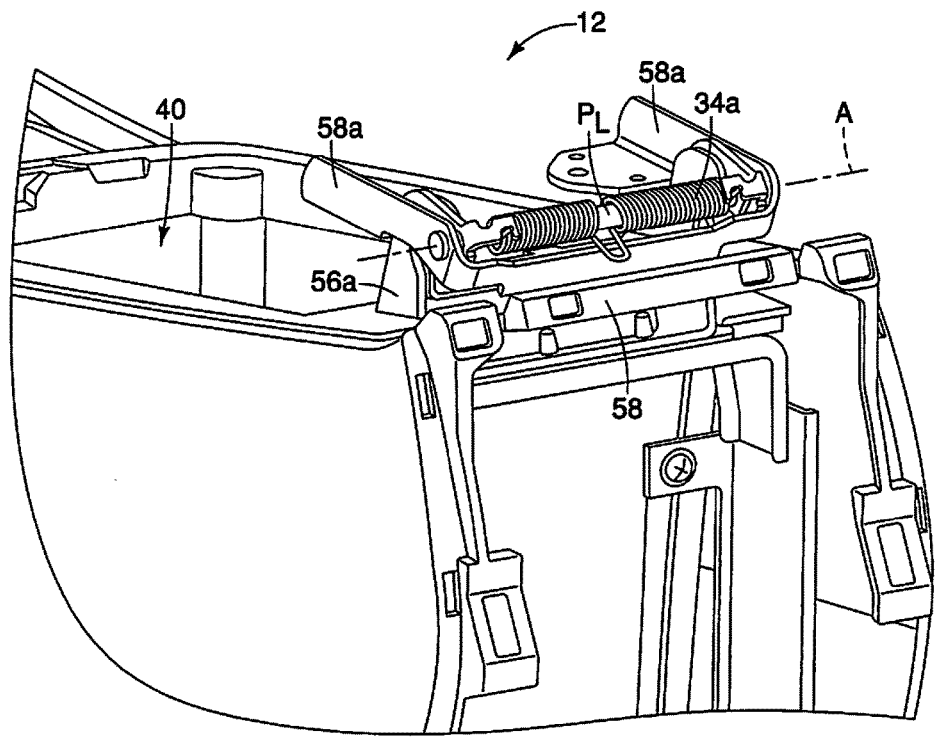
FIG. 7 is a rear perspective view of the center console assembly with a portion of the center console cut away showing details of the lid hinge in accordance with the first embodiment.

A description of the lid hinge 34 is now provided with specific reference to FIGS. 6 and 7. The lid hinge 34 includes a first part 56 and a second part 58 that are connected to one another by a pivot shaft or pivot pin P (FIG. 7) for pivoting movement about a lid pivot axis A. The first part 56 is fixedly attached to the main body structure 30 by, for example, mechanical fasteners such as threaded screws, rivets or the like. The first part 56 includes a pair of upwardly extending arms 56a (elongated extensions) that extend from the first part 56. The pivot pin P extends through apertures located proximate upper ends of the arms 56a. Hence, the pivot pin P defines the lid pivot axis A. The second part 58 includes a pair of projections 58a. The projections 58a of the second part 58 are fixed to a rear portion of lid 32 by, for example, mechanical fasteners such as threaded screws, rivets or the like. The pivot pin P further extends through apertures formed in the projections 58a. Hence, the lid 32 is supported to the main body structure 30 by the lid hinge 34 for pivoting movement about lid pivot axis A. The lid hinge 34 is provided with a biasing spring 43a that biases movement of the lid 34 toward the open orientation when the latch mechanism 32c is released.

Figure 8:
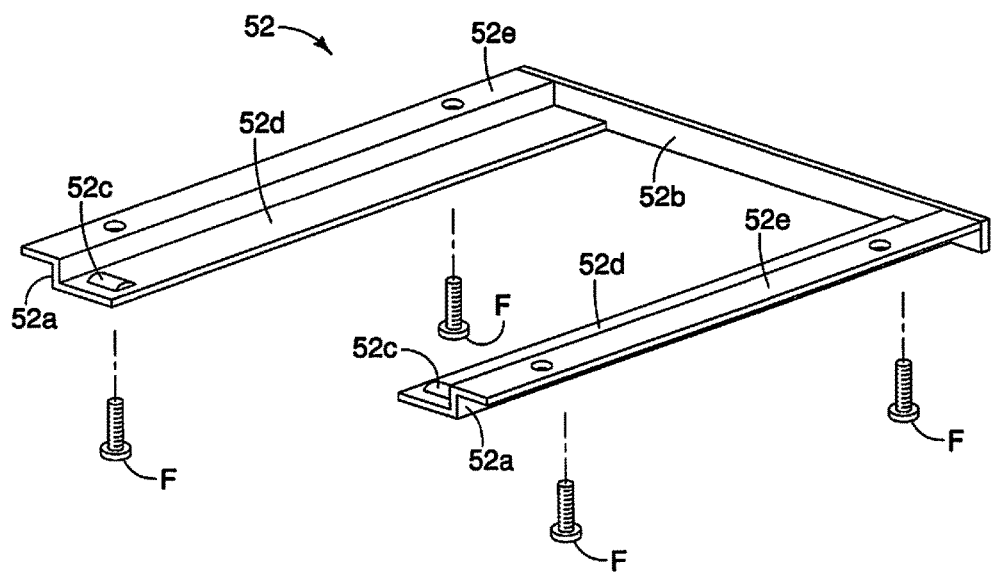
FIG. 8 is a perspective view of the tray supporting portion shown removed from the lid in accordance with the first embodiment.

The tray supporting portion 52 is a U-shaped member, as shown in FIGS. 4 and 8. In FIG. 4 the tray supporting portion 52 is shown fixed to the bottom surface 32b of the lid 32. In FIG. 8 the tray supporting portion 52 is shown removed from the lid 32. The tray supporting portion 52 can be attached to the bottom surface 32b of the lid 32 by mechanical fasteners (not shown), such as screws, rivets or snap fitting projections, or can be integrally formed with portions of the lid 32 during a molding process used to manufacture portions of the lid 32.

The tray supporting portion 52 includes two track portions 52a, an end wall 52b and movement restricting elements 52c. The two track portions 52 are spaced apart from one another and each include a tray supporting surface 52d. Each of the tray supporting surfaces 52d includes a corresponding one of the movement restricting elements 52c. The movement restricting elements 52c are basically projections locate at forward ends of the tray supporting surfaces 52d (relative to the depiction in FIG. 8). The movement restricting elements 52c extend upward from the tray supporting surface 52d.

The two track portions 52a are fixedly attached to or are formed integrally with the end wall 52b. Specifically the two track portions 52a are spaced apart from one another and extend from respective opposite ends of the end wall 52b. The end wall 52b defines a stop surface that prevents movement of the tray 14 from moving beyond the end wall 52b when installed to the tray supporting portion 52.

Figure 12:
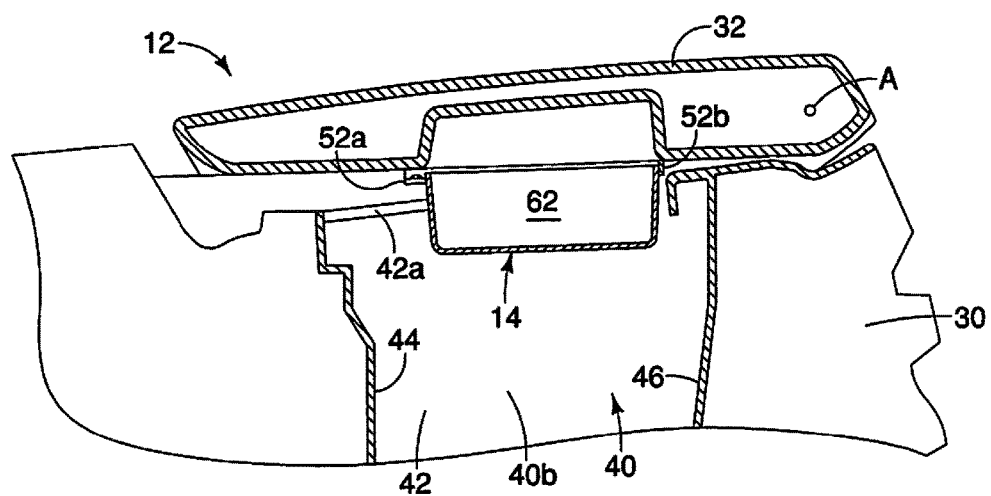
FIG. 12 is a side cross-sectional view of the rear portion of the center console assembly showing details of the lid in the closed orientation and the tray of the center console assembly with the tray inserted into the tray supporting portion of the lid in accordance with the first embodiment.
Figure 13:
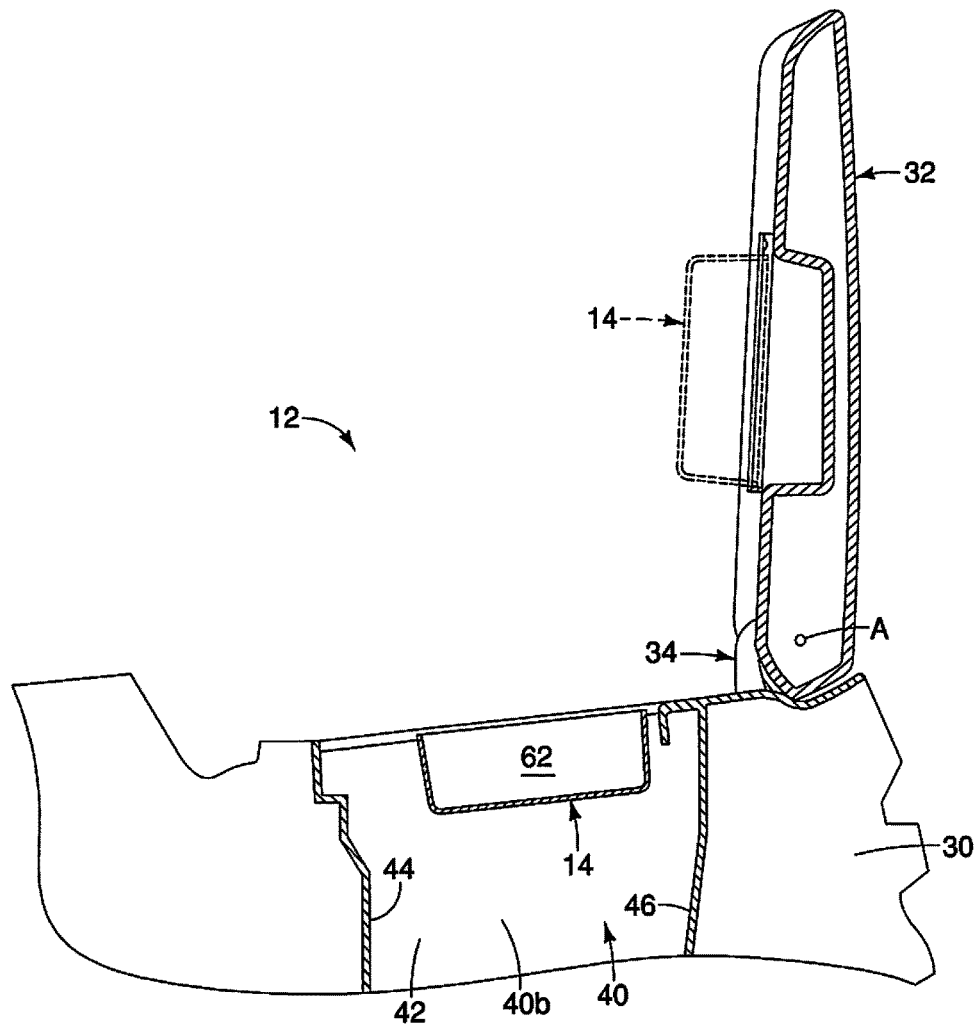
FIG. 13 is another cross-sectional view of the rear portion of the center console assembly similar FIG. 12 showing the lid in the open orientation with the tray (in solid lines) resting on projections within the storage compartment and the tray (in phantom lines) installed to the tray supporting portion of the lid in accordance with the first embodiment.

A description of the tray 14 is now provided with specific reference to FIGS. 3-5 and 9-13. The tray 14 includes a concave portion 62 (a cargo receiving area) and a pair of flanges or projections 64 that extend laterally outward from opposite sides of the tray 14, with the concave portion 62 (the cargo receiving area) located therebetween. The tray 14 is dimensioned such that with the tray 14 inserted into the storage compartment 40, the projections 64 rest on the projections 42a. Further, in the depicted embodiment, the tray 14 has an overall length that is less than the overall length of the storage compartment 40, as shown in FIG. 13. Therefore, the tray 14 can slide along the projections 42a exposing differing areas of the storage compartment 40. The tray 14 is also configured to be removed from the storage compartment 40 as shown in FIGS. 3, 4 and 5. More specifically, the tray 14 can be completely removed from the vehicle 10, if desired, or can be inserted into gaps defined between the tray supporting surface 52d of the tray supporting portion 52 and the bottom surface 32b of the lid 32, as shown in FIGS. 5 and 9-13.

Figure 9:
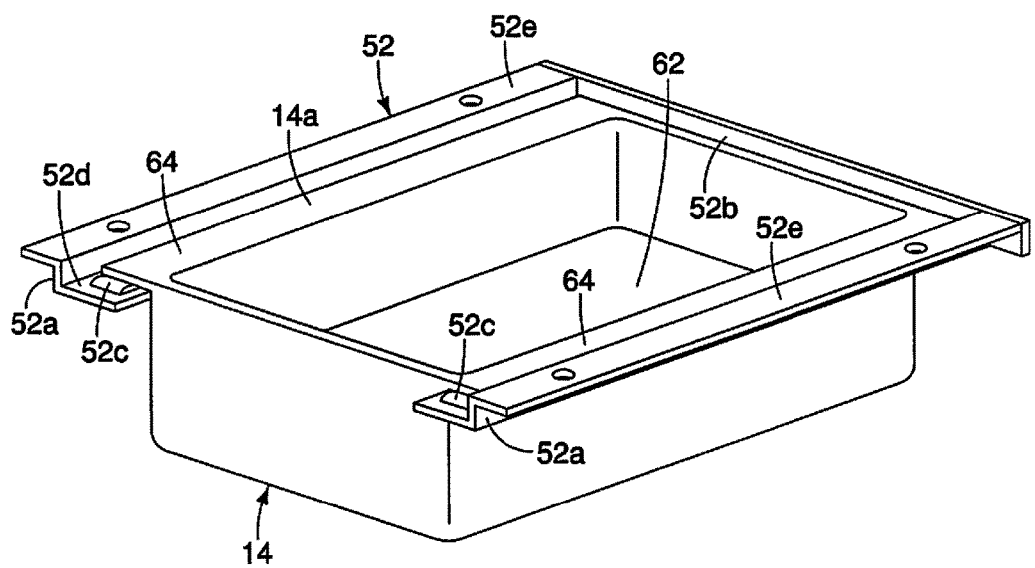
FIG. 9 is another perspective view of the tray supporting portion showing the tray slid into position on the tray supporting portion in accordance with the first embodiment.
Figure 10:
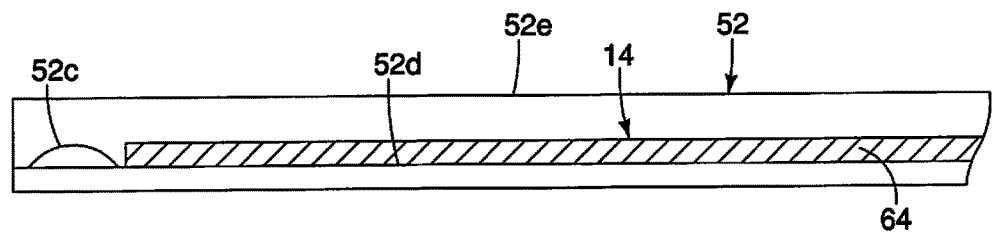
FIG. 10 is a side view of a portion of the tray supporting portion showing the tray on the tray supporting portion in accordance with the first embodiment.
Figure 11:
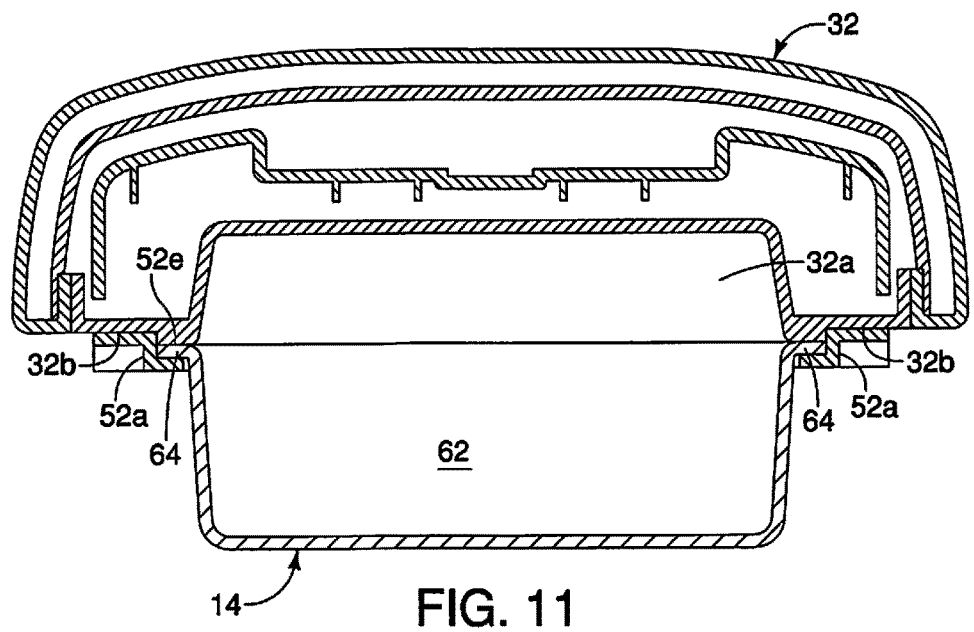
FIG. 11 is a cross-sectional view of the lid of the center console assembly taken along the line 11-11 in FIG. 2 showing details of the lid and the tray of the center console assembly with the lid in the closed orientation and the tray inserted into the tray supporting portion in accordance with the first embodiment.

In summary, the tray 14 is movable to a first orientation in which the projections 64 of the tray 14 are supported by the projections 42a (the first tray supporting portion) within the storage compartment 40; a second orientation in which the projections 64 are installed to the tray supporting portion 52 of the lid 32 (the second tray supporting portion) for movement with the lid 32; and a third orientation in which the tray 14 is completely removed and separated from both the main body structure 30 and the lid 32. As shown in FIGS. 7, 8 and 9, the tray supporting surface 52d of each of the track portions 52a of the tray supporting portion 52 is provided with the movement restricting element 52c. The movement restricting elements 52c are located such that with the projections 64 inserted between the tray supporting portion 52 and the lid 32, the movement restricting elements 52c serve to retain the tray 14 in position. Further, as shown in FIG. 9, the end wall 52b serves as a stop for the tray 14 such that the tray 14 cannot move downward when the lid 32 is in the open orientation, as shown in FIGS. 5 and 13. The movement restricting elements 52c can be integrally formed with the tray supporting portion 52 or can be separate members that are glued or mechanically attached to the tray supporting portion 52. The tray supporting portion 52 can be made of metal, plastic or polymer materials. The movement restricting elements 52c can be made of any of a variety of materials. For instance, the movement restricting elements 52c can be made of a rigid metallic material or a resilient, compressible material such as rubber or polymer materials.

In the depicted embodiment, the recessed area 32a of the lid 32 has approximately the same dimensions as the concave portion 62 of the tray 14. Consequently, when the tray 14 is installed between the tray supporting portion 52 and the lid 32, the contents of the tray 14 remain within a space defined between the tray 14 and the recessed area 32a of the lid 32 even with the lid 32 in the open orientation. Further, the upper edge 14a lies against the bottom surface 32b (an underside surface) of the lid 32. Thus, the concave portion 62 (the cargo receiving area) of the tray 14 is concealed by the lid 32. As well, the tray installed to the lid 32, the tray 14 moves with the lid 32 between the closed orientation and the open orientation. When the lid 32 is in the closed orientation, the tray 14 is located within the storage compartment 40, as shown in FIG. 12.

The tray 14 can be easily slid in and out of the tray supporting portion 52 by slightly lifting the tray 14 above the movement restricting elements 52c and pulling on the tray 14. Reinstalling the tray 14 is accomplished by inserting the projections 64 into the space between the tray supporting portion 52 and the lid 32 and pushing until the tray 14 contacts the end wall 52b. The tray 14 has an overall length that is equal to or less than the distance between the end wall 52b and the movement restricting elements 52c, as shown in FIG. 9.

It should be understood from the drawings and the description herein that the overall length of the tray 14 relative to the overall dimensions of the storage compartment 40 can vary from vehicle design to vehicle design. For example, the tray 14 (and the tray supporting portion 52) can be longer such that the tray 14 completely covers the storage compartment 40. However, in the depicted embodiment, the tray 14 has an overall length that is approximately half the overall length of the storage compartment 40.

One advantage of the above described arrangement of the tray 14, the tray supporting portion 52 and the lid 32 is that with the tray 14 installed between the tray supporting portion 52 and the lid 32, the contents of the tray 14 are hidden, even when the lid 32 is in the open orientation providing a concealed compartment.

With the tray 14 installed to the tray supporting portion 52, the upper edge 14a and upper surface of the tray 14 contacts or rests adjacent to the bottom surface 32b (an underside surface) of the lid 32. The tray 14 basically mates with the bottom surface 32b of the lid 32. With the lid 32 in the closed orientation, the tray supporting portion 52 of the lid 32 is dimensioned to mate with an upper area of the storage compartment 40, such that the tray 14 and the tray supporting portion 52 do not interfere with the opening and closing of the lid 32. Further, as shown in FIG. 4, the storage compartment 40 has a first overall length $L_1$ defined between the front wall 44 and the rear wall 46. The tray 14 defines a second overall length $L_2$. The first overall length $L_1$ is greater than the second overall length $L_2$. Due to the difference in length between the tray 14 and the storage compartment 40, when the tray 14 is the above mentioned first orientation in which the projections 64 of the tray 14 are supported by the projections 42a, the tray 14 is slidably supported by the projections 42a (a tray supporting portion) for movement in a direction of the first overall length $L_1$ between the front wall 44 and the rear wall 46 of the storage compartment 40.

Second Embodiment

Figure 14:
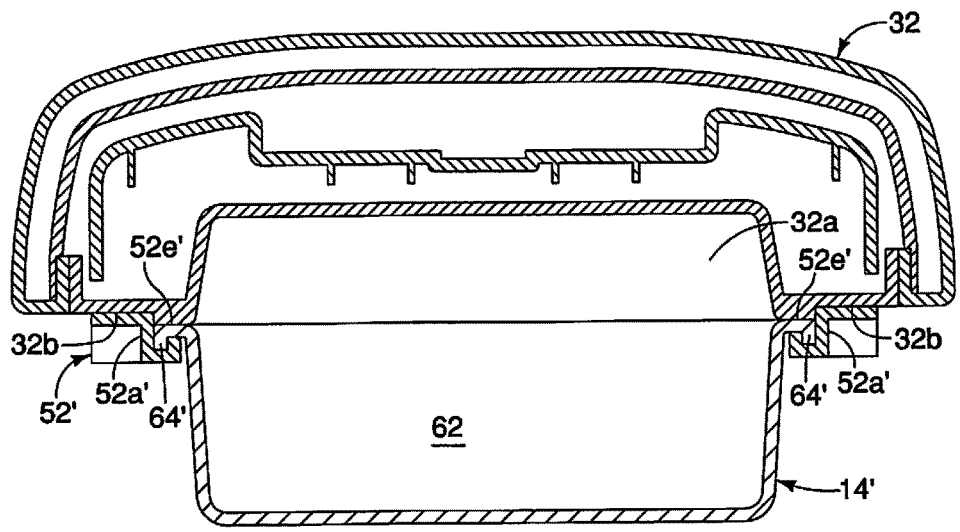
FIG. 14 is a cross-sectional view of the lid of the center console assembly similar to FIG. 9 showing details of the lid and a tray of the center console assembly with the lid in the closed orientation and the tray inserted into a tray supporting portion in accordance with a second embodiment.

Referring now to FIG. 14, a tray 14' and a stray supporting portion 52' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

In the second embodiment, the center console assembly 12 includes all of the features described above with respect to the first embodiment, except that the tray 14 has been replaced with the tray 14' and the lid 32 has been replaced with the lid 32'.

The lid 32' is identical to the lid 32 of the first embodiment except that the tray supporting portion 52 has been replaced with a tray supporting portion 52'. The tray supporting portion 52' is identical to the tray supporting portion 52 except that the overall shape of track portions 52a have been modified to form track portions 52a'. Further, the tray 14 is identical to the tray 14 of the first embodiment except that the projections 64 have been modified to form projections 64'. The projections 64' have a hook shape when viewed in cross-section. The shape of the projections 64' mates with the shape of the track portions 52a'. The shapes of the projections 64' and the track portions 52a' complement one another and prevent lateral movement of the tray 14' when the tray 14' is installed in the track portions 52a' against the underside of the lid 32.

The various elements shown in the passenger compartment of the vehicle 10 other that the center console assembly 12 are conventional components that are well known in the art. Since these elements are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the center console assembly. Accordingly, these terms, as utilized to describe the present invention should be interpreted relative to a vehicle equipped with the center console assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle center console assembly comprising:
   a main body structure defining a storage compartment having a first tray supporting portion and a lid hinge fixedly attached to the main body structure;
   a lid attached to the main body structure via the lid hinge for pivoting movement relative to the main body structure such that the lid moves from a closed orientation completely covering the storage compartment and an open orientation exposing the storage compartment, the lid having a second tray supporting portion that is spaced apart from the lid hinge; and
   a tray having a cargo receiving area and a pair of projections that extend from opposite sides of the tray, the tray being movable and removable to and from each of the following: a first orientation in which the pair of projections are supported by the first tray supporting portion within the storage compartment, a second orientation in which the pair of projections are installed to the second tray supporting portion for the pivoting movement with the lid, and a third orientation in which the tray is completely removed and separated from both the main body and the lid, and with the tray in any one of the first orientation, the second orientation and the third orientation, the tray is spaced from the lid hinge.

2. The vehicle center console assembly according to claim 1, wherein
   the pair of side projections are dimensioned such that with the tray positioned within the storage compartment of the main body the side projections are supported by the tray supporting portion.

3. The vehicle center console assembly according to claim 1, wherein
   the tray and the second tray supporting portions are configured such that with the tray in the second orientation the tray is retained against an underside surface of the lid, with the cargo receiving area of the tray being concealed by the lid.

4. The vehicle center console assembly according to claim 1, wherein
   the tray and the second tray supporting portions are configured such that with the tray in the second orientation the tray moves with the lid between the closed orientation and the open orientation.

5. The vehicle center console assembly according to claim 4, wherein
   the tray and the second tray supporting portions are configured such that with the tray in the second orientation and the lid in the closed orientation the tray is located within the storage compartment.

6. A vehicle center console assembly comprising:
   a main body structure defining a storage compartment having a first tray supporting portion;
   a lid attached to the main body structure for pivoting movement such that the lid moves from a closed orientation completely covering the storage compartment and an open orientation exposing the storage compartment, the lid having a second tray supporting portion; and
   a tray having a cargo receiving area and a pair of projections that extend from opposite sides of the tray, the tray being movable and removable to and from each of the following: a first orientation in which the pair of projections are supported by the first tray supporting portion within the storage compartment, a second orientation in which the pair of projections are slidably installed to the second tray supporting portion for the pivoting movement with the lid, and a third orientation in which the tray is completely removed and separated from both the main body and the lid, the second tray supporting portion including two brackets, each bracket having a lid attachment surface that fixes the brackets to an underside surface of the lid and a tray supporting surface that is spaced apart from the underside surface in order to receive a corresponding one of the pair of projection of the tray.

7. The vehicle center console assembly according to claim 6, wherein
   the tray supporting surface includes a movement restricting element at a forward end thereof that restricts movement of the tray with the tray in the second orientation.

8. The vehicle center console assembly according to claim 6, wherein
   the second tray supporting portion includes a stop surface located at one end of the pair of brackets, the stop surface prevents movement of the tray with the tray in the second orientation.

9. The vehicle center console assembly according to claim 1, wherein
the main body is dimensioned such that the storage compartment is divided by the first tray supporting portion into a lower section covered at least partially covered by the tray with the tray in the first orientation and an upper section located above the tray with the tray in the first orientation.

10. The vehicle center console assembly according to claim 1, wherein
the main body includes a first wall and a second wall that face one another and are spaced apart from one another with the storage compartment being defined between the first wall and the second wall, the first tray supporting portion being defined by a first projections formed on the first wall and a second projection formed on the second wall, the first projection and the second projection extending toward one another within the storage compartment.

11. The vehicle center console assembly according to claim 10, wherein
the pair of side projections of the tray are dimensioned such that with the tray positioned within the storage compartment of the main body the side projections are supported by the first projection and the second projection with the tray extending therebetween.

12. The vehicle center console assembly according to claim 1, wherein
the main body includes a hinge structure having a first portion fixed to a rear portion of the main body and a second portion fixed to the lid with a pivot axis being defined at the intersection of the first portion and the second portion, the lid being pivotally supported by the hinge structure for pivoting movement relative to the main body.

13. The vehicle center console assembly according to claim 1, wherein
the second tray supporting structure includes an underside surface that is dimensioned to mate with an upper area of the main body surrounding an upper end of the storage compartment with the lid in the closed orientation.

14. The vehicle center console assembly according to claim 13, wherein
the tray and the second tray supporting portions are configured such that with the tray in the second orientation the tray is retained against an underside surface of the lid with the cargo receiving area of the tray being concealed by the lid.

15. The vehicle center console assembly according to claim 1, wherein
a tray having a cargo receiving area and a pair of projections that extend from opposite sides of the tray, the tray being movable and removeable to and from each of the following: a first orientation in which the pair of projections are slidably supported by the first tray supporting portion within the storage compartment for sliding movement along the first tray supporting portion, a second orientation in which the pair of projections are slidably installed to the second tray supporting portion for the pivoting movement with the lid, and a third orientation in which the tray is completely removed and separated from both the main body and the lid, such that
in the first orientation the tray is supported by the first tray supporting portion for sliding movement between forward and rearward locations along the first tray supporting portions,
in the second orientation the tray is retained by the second tray supporting portion, and is slidably removable from the second tray supporting portion, and
in the third orientation the tray is removed from the main body structure, the first tray supporting portion and removed from the second tray supporting portion.

16. The vehicle center console assembly according to claim 1, wherein
the storage compartment has a first overall length defined between a front wall and a rear wall thereof, and the tray defines a second overall length, the first overall length being greater than the second overall length.

17. The vehicle center console assembly according to claim 16, wherein
the second overall length of the tray is such that with the tray in the first orientation, the tray is slidably supported by the first tray supporting portion for movement in a direction of the first overall length between the front wall and the rear wall of the storage compartment.

18. A vehicle center console assembly comprising:
a main body structure defining a storage compartment having a first tray supporting portion;
a lid attached to the main body structure for pivoting movement such that the lid moves from a closed orientation completely covering the storage compartment and an open orientation exposing the storage compartment, the lid having a second tray supporting portion; and
a tray having a cargo receiving area and a pair of projections that extend from opposite sides of the tray, the tray being movable and removeable to and from each of the following: a first orientation in which the pair of projections are slidably supported by the first tray supporting portion within the storage compartment for sliding movement along the first tray supporting portion, a second orientation in which the pair of projections are slidably installed to the second tray supporting portion for the pivoting movement with the lid, and a third orientation in which the tray is completely removed and separated from both the main body and the lid, such that
in the first orientation the tray is supported by the first tray supporting portion for sliding movement between forward and rearward locations along the first tray supporting portions,
in the second orientation the tray is retained by the second tray supporting portion, and is slidably removable from the second tray supporting portion, and
in the third orientation the tray is removed from the main body structure, the first tray supporting portion and removed from the second tray supporting portion.

* * * * *